(12) United States Patent
Stapleton

(10) Patent No.: US 12,284,588 B2
(45) Date of Patent: *Apr. 22, 2025

(54) DAS INTEGRATED DIGITAL OFF-AIR REPEATER

(71) Applicant: Dali Wireless, Inc., Menlo Park, CA (US)

(72) Inventor: Shawn Patrick Stapleton, Vancouver (CA)

(73) Assignee: Dali Wireless, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,887

(22) Filed: Sep. 29, 2023

(65) Prior Publication Data

US 2024/0236812 A1 Jul. 11, 2024

Related U.S. Application Data

(63) Continuation of application No. 17/870,728, filed on Jul. 21, 2022, now abandoned, which is a continuation of application No. 16/991,511, filed on Aug. 12, 2020, now abandoned, which is a continuation of application No. 16/230,253, filed on Dec. 21, 2018, now Pat. No. 10,779,217, which is a continuation of application No. 15/448,338, filed on Mar. 2, 2017, now abandoned, which is a
(Continued)

(51) Int. Cl.
| | |
|---|---|
| *H04W 40/22* | (2009.01) |
| *H04B 7/026* | (2017.01) |
| *H04B 10/2575* | (2013.01) |
| *H04W 40/20* | (2009.01) |
| *H04W 88/08* | (2009.01) |

(52) U.S. Cl.
CPC ............ *H04W 40/22* (2013.01); *H04B 7/026* (2013.01); *H04B 10/25753* (2013.01); *H04W 40/20* (2013.01); *H04W 88/085* (2013.01)

(58) Field of Classification Search
CPC ........... H04W 72/231; H04W 72/1263; H04W 88/08; H04L 1/1812; H04B 10/2575; H04B 7/022

See application file for complete search history.

(56) References Cited

U.S. PATENT DOCUMENTS

| | | | | |
|---|---|---|---|---|
| 2009/0180426 A1* | 7/2009 | Sabat | ................. | H04W 88/085 |
| | | | | 398/116 |
| 2011/0237182 A1* | 9/2011 | Stratford | ............... | H04W 52/52 |
| | | | | 455/39 |
| 2012/0039254 A1* | 2/2012 | Stapleton | .............. | H03F 1/3247 |
| | | | | 370/328 |

* cited by examiner

*Primary Examiner* — Iqbal Zaidi
(74) *Attorney, Agent, or Firm* — Aka Chan LLP

(57) ABSTRACT

Embodiments may allow remote base transceiver stations (BTSs) physically located away from a local source of users to be able to provide local service as if the remote BTSs were at or near the local source of users. Some embodiments may include a plurality of BTSs, each having one or more sectors, and one or more digital access units (DAUs). Embodiments may also include a plurality of repeater digital units (RDUs), where each RDU may be configured to communicate to at least one of the plurality of BTSs and may be operable to route signals optically to the one or more DAUs. Embodiments may also include a plurality of digital remote units (DRUs) located at a location remote to the one or more DAUs, wherein the plurality of remote DRUs may be operable to transport signals to the one or more DAUs.

20 Claims, 9 Drawing Sheets

Related U.S. Application Data continuation of application No. 14/743,789, filed on Jun. 18, 2015, now Pat. No. 9,622,148, which is a continuation of application No. 14/044,668, filed on Oct. 2, 2013, now Pat. No. 9,112,549.

(60) Provisional application No. 61/710,391, filed on Oct. 5, 2012.

DAS INTEGRATED DIGITAL OFF-AIR REPEATER

CROSS-REFERENCE TO RELATED APPLICATIONS

This patent application is a continuation of U.S. patent application Ser. No. 17/870,728, filed Jul. 21, 2022, abandoned, which is a continuation of U.S. patent application Ser. No. 16/991,511, filed Aug. 12, 2020, abandoned, which is a continuation of U.S. patent application Ser. No. 16/230,253, filed Dec. 21, 2018, issued as U.S. Pat. No. 10,779,217 on Sep. 15, 2020, which is a continuation of U.S. patent application Ser. No. 15/448,338, filed on Mar. 2, 2017, abandoned, which is a continuation of U.S. patent application Ser. No. 14/743,789, filed on Jun. 18, 2015, issued as U.S. Pat. No. 9,622,148, issued on Apr. 11, 2017, which is a continuation of U.S. patent application Ser. No. 14/044,668, filed on Oct. 2, 2013, issued as U.S. Pat. No. 9,112,549 on Aug. 18, 2015, which claims priority to U.S. patent application 61/710,391, filed on Oct. 5, 2012. These applications are incorporated by reference along with all other references cited in this application.

BACKGROUND OF THE INVENTION

Wireless and mobile network operators face the continuing challenge of building networks that effectively manage high data-traffic growth rates. Mobility and an increased level of multimedia content for end users requires end-to-end network adaptations that support both new services and the increased demand for broadband and flat-rate Internet access. One of the most difficult challenges faced by network operators is maximizing the capacity of their DAS networks while ensuring cost-effective DAS deployments and at the same time providing a very high degree of DAS remote unit availability.

Despite the progress made in DAS networks, there is a need in the art for improved methods and systems related to DAS networks.

BRIEF SUMMARY OF THE INVENTION

The present invention generally relates to wireless communication systems employing Distributed Antenna Systems (DAS) as part of a distributed wireless network. More specifically, the present invention relates to a DAS utilizing a software configurable repeater digital unit (RDU). In a particular embodiment, the present invention has been applied to optically fed digital repeaters that can be configured in a star configuration or a daisy chained configuration. The methods and systems described herein are applicable to a variety of communications systems including systems utilizing various communications standards.

Wireless and mobile network operators face the continuing challenge of building networks that effectively manage high data-traffic growth rates. Mobility and an increased level of multimedia content for end users typically employs end-to-end network adaptations that support new services and the increased demand for broadband and flat-rate Internet access.

A distributed antenna system (DAS) provides an efficient means of utilization of base station resources. The base station or base stations associated with a DAS can be located in a central location and/or facility commonly known as a base station hotel. The DAS network comprises one or more digital access units (DAUs) that function as the interface between the base stations and the digital remote units (DRUs). The DAUs can be collocated with the base stations. Under certain embodiments the base station resources may not be collocated with the DAUs. Off-Air Repeaters can be used to relay remote BTS signals to one or more DAUs. One or more Off-Air Repeaters can be used to communicate with one or more base stations. The Off-Air Repeaters relay the RF signals between the Donor BTS and coverage area.

Some embodiments may include a system for routing signals in a Distributed Antenna System (DAS). The system may include a plurality of base transceiver stations (BTS), each having one or more sectors, and one or more digital access units (DAUs). The system may also include a plurality of repeater digital units (RDUs), where each RDU may be configured to communicate to at least one of the plurality of BTSs and may be operable to route signals optically to the one or more DAUs. The system may also include a plurality of digital remote units (DRUs) located at a location remote to the one or more DAUs, wherein the plurality of remote DRUs may be operable to transport signals to the one or more DAUs.

In some embodiments, the one or more DAUs may be coupled together via at least one of Ethernet cable, Optical Fiber, Microwave Line of Sight Link, Wireless Link, or Satellite Link. In some embodiments, the plurality of RDUs may be connected to the one or more DAUs via at least one of Ethernet cable, Optical Fiber, Microwave Line of Sight Link, Wireless Link, or Satellite Link. In some embodiments, the plurality of RDUs may be interconnected in a daisy chain configuration. In other embodiments, the plurality of RDUs may be connected to one of the one or more DAUs in a star configuration. In some embodiments, the plurality of RDUs may include multi-frequency, multi-operator and multi-antenna characteristics. In some embodiments, the plurality of RDUs may exhibit multiple input multiple output (MIMO) characteristics.

Some embodiments may include a method for routing signals in a Distributed Antenna System (DAS). The method may comprise receiving at a repeater digital unit (RDU) a radio frequency (RF) signal from a remote base transceiver station (BTS), converting the signal from RF to a digital signal, and transporting the digital signal through an optical cable to a digital access unit (DAU). Embodiments may also include multiplexing the digital signal, and routing the multiplexed signal from the DAU to at least one digital remote unit (DRU). Some embodiments may also include demultiplexing the digital signal at the least one DRU to regenerate the digital signal. In some embodiments, the RDU may comprise one or more PEER ports and one or more LAN ports. In some embodiments, the DAU may comprise one or more PEER ports and one or more LAN ports.

Numerous benefits are achieved by way of the present invention over conventional techniques. Traditionally an Off-Air Repeater communicates with the donor BTS via a wireless RF signal and communicates with the coverage area via a wireless RF signal. Off-Air Repeaters are prone to instability because of their high gain and RF coupling between the Donor RF port and the Coverage RF port. A software configurable digital repeater digital unit (RDU) relays the RF signals to a DAU via an optical cable. The RF signals from the Off-Air Repeater are transported digitally over an optical cable to one or more DAUs. This eliminates the instability problems associated with a traditional Off-Air Repeater as well as enabling multiple Off-Air Repeaters to be configured in a star or daisy chain configuration. Transporting the Off-Air Repeater signal from the donor BTSs optically provides an additional benefit of enabling multiplexing of multiband signals from multiple Off-Air Repeaters. Additionally, embodiments enable the routing of the Off-Air Repeater signals to one or more remote locations. These and other embodiments of the invention along with many of its advantages and features are described in more detail in conjunction with the text below and attached figures.

DETAILED DESCRIPTION OF THE INVENTION

Figure 1:
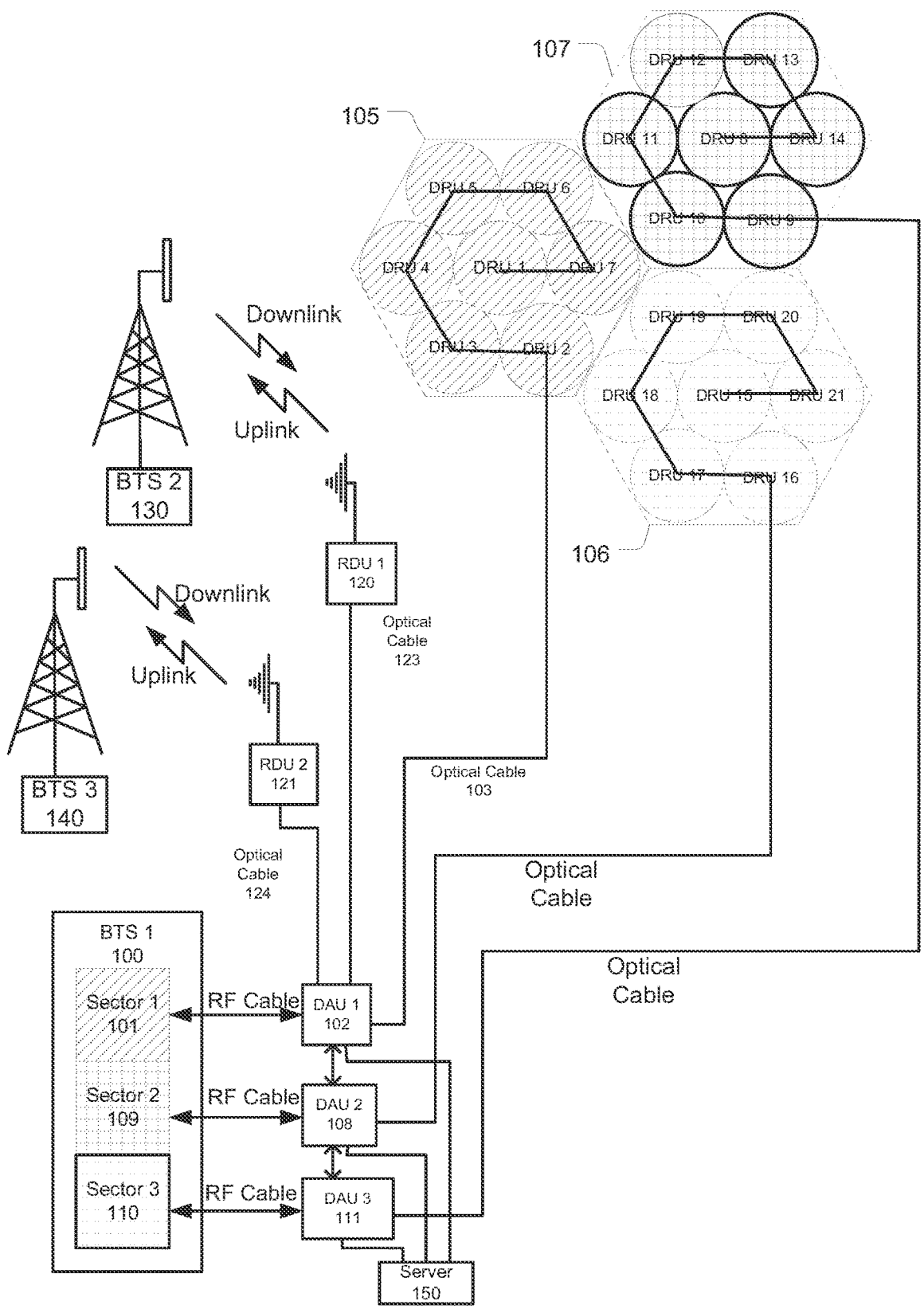
FIG. 1 is a block diagram according to one embodiment showing a basic structure and an example of the transport routing based on having a three-sector BTS with 3 Digital Access Units (DAUs) at a local location, two Repeater Digital Units (RDUs) at a local location and Digital Remote Units (DRUs) at a remote location. In embodiments according to FIG. 1, two RDUs are connected to a DAU at the local location.

Embodiments may be drawn to off air repeaters, which are telecommunications repeaters that take a signal "off air," but "over the air." Traditionally, repeaters in the prior art may be coupled to base transceiver stations (BTS) via radio frequency (RF) cable. Typically, all communications to and from repeaters in the prior art may occur via RF. There may be several problems to the traditional approach of repeaters. One problem may be that feedback may occur from the RF cable connecting the repeaters to the antenna at the BTS. This feedback may cause signal oscillations, which results in co-channel interference. Another problem may be that the quality of the signal may degrade over longer distances of RF cable, due to cable losses over longer distances.

In addition, in traditional configurations having a base station in an enclosed, less accessible area, e.g., a basement, only some telecommunications operators—e.g., AT&T, Verizon, etc. —may own base stations in that enclosed area. Other operators, e.g., Sprint or T-Mobile, may not own base stations housed in that same area, but instead may own base stations that are at some remote location, e.g., locations 2 kilometers away. Users near the basement—e.g., users in the same building above the basement—with subscriptions to AT&T and Verizon should have superior reception compared to users near the basement with subscriptions to Sprint or T-Mobile. It may be desirable then for operators of remote base stations to be able to access the base stations in the basement, rather than build their own base stations and spend more resources in the process. It may also be desirable to transmit signals from the remote BTSs to the local source in a reliable and efficient manner, without loss of signal quality and minimal interference.

An off air repeater according to embodiments may help solve at least these problems. Embodiments may allow remote BTSs physically located away from a local source of users to be able to provide local service as if the remote BTSs were at or near the local source of users. In some embodiments, base stations may be housed in areas that are less accessible, e.g., in a basement of a building. In this context, some embodiments may house a rack of digital access units (DAUs) close to the base station which may be coupled via RF cable. Embodiments may utilize an off-air repeater, or a repeater digital unit (RDU), to route signals from the remote BTSs over the air to at least one DAU (e.g., a rack of DAUs) housed near the local source of users (e.g., the basement in the building of the users). RDUs of some embodiments may receive the Downlink RF signal from a donor/remote BTS, amplify and filter the RF signal and then re-transmit it to a coverage area. The coverage area may be outdoors or indoors. The uplink signal from the coverage area may be amplified, filtered and re-transmitted to the donor/remote BTS. A traditional repeater has one or more RF input ports and RF output ports. Using RF cables between the Repeater and indoor antennas facilitates indoor coverage. Embodiments may utilize optical cable, instead of RF, connecting from the RDUs to the at least one DAU. The optical cabling may allow for digital transmission of signals between the remote BTSs and the at least one DAU. Once signals reach the at least one DAU, they can be routed to various digital remote units (DRUs), which may provide close reception to the local source of users.

As previously mentioned, embodiments may utilize RDUs connected by optical cabling, rather than RF cabling, to transport signals. Advantages may include, for example, eliminating co-channel interference. Another may be having the ability to multiplex the RF signal due to transporting the signal digitally. Another advantage may be reducing or eliminating signal degradation due to transporting the signal digitally. Also, embodiments may be distinguishable from traditional systems with repeaters in that the downlink and uplink signal directions between RDUs and DRUs may be reversed. For example, signals coming from an RDU, going down to a DAU and then being routed to DRUs may traditionally be downlink signals. In contrast, embodiments have the ability to reverse the direction of the downlink and uplink signals in the DAU.

FIG. 1 may illustrate a distributed antenna system (DAS) network architecture according to some embodiments of the present invention. A DAS according to some embodiments may provide an efficient means of utilization of base station resources. The base station or base stations associated with a DAS can be located in a central location and/or facility commonly known as a base station hotel. The DAS network comprises one or more digital access units (DAUs) that function as the interface between the base stations and the digital remote units (DRUs). The DAUs can be collocated with the base stations. The DRUs can be daisy chained together and/or placed in a star configuration and provide coverage for a given geographical area. The DRUs may be connected with the DAUs by employing a high-speed optical fiber link. This approach may facilitate transport of the RF signals from the base stations to a remote location or area served by the DRUs. A base station may comprise three independent radio resources, commonly known as sectors. These three sectors may be used to cover three separate geographical areas without creating co-channel interference between users in the three distinct sectors. In other embodiments, additional sectors are associated with each BTS, for example, up to or more than twelve sectors.

Here, FIG. 1 provides an example of a data transport scenario between a three-sector Base Station, multiple local DAUs, multiple Repeater Digital Units (RDUs) and multiple DRUs. BTS1 100 is connected to DAU1 102, DAU2 108, and DAU3 111 (i.e., local DAUs) by an RF cable in the illustrated embodiment. BTS2 130 and BTS3 140 communicate Off-Air RF signals with RDU1 120 and RDU2 121, respectively. Each of the local DAUs is connected to server 150. In FIG. 1, the RDUs are connected in a star configuration with DAU1 102 using optical cables. The following descriptions provide additional detail to several different features in FIG. 1 according to some embodiments.

Still referring to FIG. 1, multiple RDUs, e.g., RDU1 120 and RDU2 121, may be placed in varying locations while being connected to the same DAU1 102. Each RDU may provide repeater service to a different BTS, e.g., RDU1 120 provides repeater service for BTS2 130 to DAU1 102, and RDU2 121 provides repeater service for BTS3 to DAU1 102. Multiple RDUs servicing multiple remote BTSs may be beneficial for several reasons. For example, the DAUs 102, 108, 111, may be housed in a building, and a telecommunications operator, e.g., Sprint, may have a remote BTS located west of the building, a few kilometers away. Thus, it would be desirable to have an antenna on the top of the building facing west. At the same time, another telecommunications operator, e.g., T-Mobile, may have a base station that is north of the building. Thus, it would be beneficial to have two different repeaters communicating with those different base stations, one for the northern located BTS and the other for the western located BTS. Other benefits may include an ability for multiple telecommunications operators to have more exclusive control and access with different RDUs. Other benefits may include reducing resources needed to optimally service multiple operators.

Some embodiments include the ability to route the local Base Station 100 and remote Base Stations 130, 140 radio resources, among the RDUs and DAUs. In order to route radio resources available from one or more Base Stations, it may be desirable to configure the individual router tables of the DAUs and RDUs in the DAS network. This functionality may be provided by some embodiments.

Still referring to FIG. 1, the DAUs may be networked together to facilitate the routing of signals among multiple DAUs. The DAUs may support the transport of the RF downlink and RF uplink signals between the BTSs and the various DAUs. This architecture may enable the various BTS signals to be transported simultaneously to and from multiple DAUs. PEER ports are used for interconnecting DAUs. PEER ports may be discussed in more detail in later paragraphs of this disclosure.

The DAUs may have the capability to control the gain (in small increments over a wide range) of the downlink and uplink signals that are transported between the DAU and the base station (or base stations) connected to that DAU. This capability may provide flexibility to simultaneously control the uplink and downlink connectivity of the path between a particular RDU (or a group of RDUs) and a particular base station.

The DAU may communicate with a Network Operational Control (NOC). The NOC sends commands and receives information from the DAS network. The DAS network can include a plurality of DAUs, RDUs and DRUs. The DAU communicates with the network of DRUs and the DAU sends commands and receives information from the DRUs. The DAUs include physical nodes that accept and deliver RF signals and optical nodes that transport data. A DAU can include an internal server or an external server. The server is used to archive information in a database, store the DAS network configuration information, and perform various traffic related processing. The server can be used to communicate information from the DAS Network to the NOC.

Additionally, an RDU may communicate with a DAU or rack of DAUs. In some embodiments, the RDU does not communicate with the NOC. The RDU receives commands from the DAU and delivers information to the DAU. The RDUs include physical nodes that accept and deliver RF signals and optical nodes that transport data.

As previously mentioned, BTS1 100 may be separated into a plurality of sectors. In this case, BTS1 100 shows three sectors: sector 1 101, sector 2 109, and sector 3 110. Each sector may be associated with at least one antenna on top of at least one tower, each antenna connected to typically an RF cable that would connect to BTS1 100. Each antenna would provide signal coverage up to some angle, e.g., 120 degrees, around BTS1 100. Thus, when combining all three sectors, BTS1 100 may provide 360 degrees of signal coverage.

Each sector may be connected via RF cable to a DAU. In this case, sector 1 101 is connected to DAU1 102, sector 2 109 is connected via RF cable to DAU2 108, and sector 3 110 is connected via RF cable to DAU3 111. In other embodiments, the sectors may be connected to the same DAU. In some embodiments, each DAU may be owned by a different telecommunications operator, allowing each operator to control information of its subscribers. Each DAU may also contain a neutral host that allows other operators to transmit their information and signals to DAUs they do not control.

As alluded to above, embodiments may allow for different telecommunications operators with remote base stations to provide stronger signal coverage to a local building containing the DAS architecture according to some embodiments described herein. For example, say Verizon owns BTS2 130, and T-Mobile owns BTS3 140, but Metro PCS owns BTS1 100 and Verizon and T-Mobile do not normally have access to BTS1 100. However, both Verizon and T-Mobile want coverage in the building housing BTS1 100. Transmitting signals just from their respective BTSs 130, 140, Verizon and T-Mobile may be able to provide only weak signal coverage to the building because the building is several kilometers from their respective BTSs 130, 140. Using various embodiments of the present invention, however, the RDUs connecting the BTSs 130, 140 may allow Verizon and T-Mobile to provide coverage to the building with a signal strength just as strong as Metro PCS.

Embodiments may connect the DAUs to various cells of DRUs to complete the configuration of supplying signals of different operators from remote BTSs to their customers or users. In this case, cell 1 105, cell 2 106, and cell 3 107 may contain a "flower" arrangement of DRUs, which may be located in the building. Thus, each operator may provide strong coverage to all of the users that cell 1 105, cell 2 106, and cell 3 107 provide coverage for, even though some other operator's BTSs are located far away.

In FIG. 1, server 150 is shown to be connected to the three DAUs 102, 108, and 111. In some embodiments, a server 150 may provision all the DRUs, all the DAUs and the RDUs to be configured as needed. In essence, server 150 may act like a network management server. In other embodiments, server 150 may configure how the DAS is going to be set up. Each DAU, DRU, and RDU may contain a series of ports that are configurable, depending on need and function. Server 150 may facilitate designation of what each port is supposed to function as. For example, a port may act as a PEER port, or a LAN port, and server 150 may designate that. In another example, server 150 may configure the DRUs because some of the DRUs may only be able to transmit certain bands. An example description of the hardware configurations will be described in later figures.

In addition, FIG. 1 may show a star configuration of RDUs, in that each RDUs is connected to the same DAU1 102. In this case, signals in different frequency bands and with different frequencies within the same frequency band may be summed in DAU1 102 to create a single composite signal when transmitted to the various cells. The signals can then be separated using traditional filtering techniques, knowing that the signals each originate in different frequencies. A benefit to having a star configuration of RDUs may be where the BTSs are located if different geographic locations.

Figure 2A:
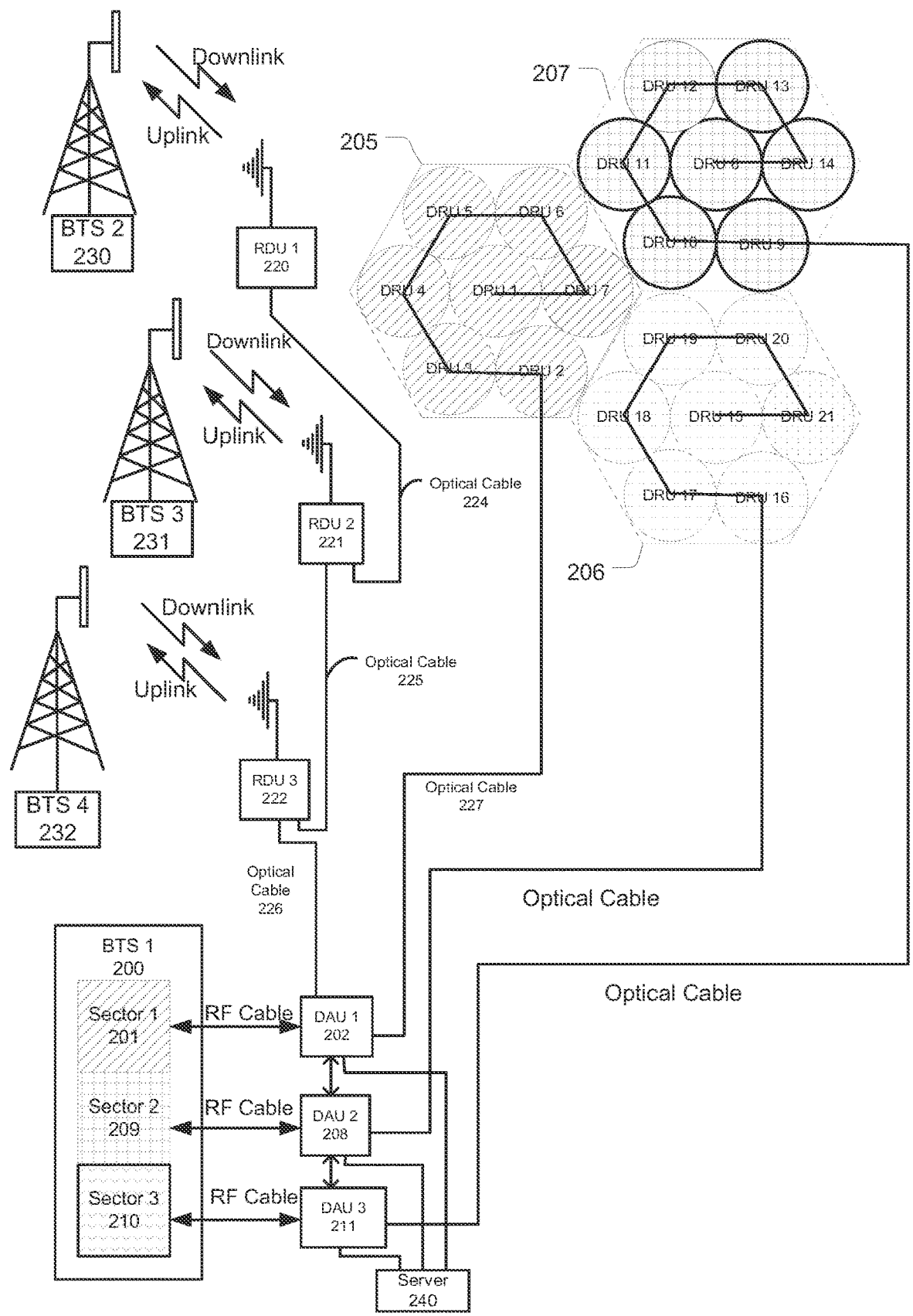
FIG. 2A is a block diagram according to one embodiment showing a basic structure and an example of the transport routing based on having a three-sector BTS with 3 DAUs at a local location, two RDUs daisy chained together at a local location and optical interfaces to DRUs at the remote locations.

Referring to FIG. 2A, the individual base station radio resources from BTS2 230, BTS3 231 and BTS4 232 are transported to a daisy-chained network of RDUs. Each individual BTS radio resources provide coverage to an independent geographical area. FIG. 2A demonstrates how three independent BTSs, each BTS communicating with an independent RDU, provide input into a single DAU while the RDUs are connected in a daisy-chained configuration. A server 240 may be utilized to control the routing function provided in the DAS network, and may function similarly to server 150 described in FIG. 1.

Referring to FIG. 2A and by way of example, DAU1 202 may receive downlink signals and may transmit uplink signals from and to the daisy chained network of RDUs 220, 221, 222. RDU1 220 may translate the RF signals to optical signals for the downlink and may translate the optical signals to RF signals for the uplink. The optical fiber cable 224 may transport the BTS2 230 signals between RDU1 221 and RDU2 222. The optical signals from RDU1 221 and RDU2 222 may be multiplexed on optical fiber cable 225. The other RDUs in the daisy chain may be involved in passing the optical signals onward to DAU1 202. DAU1 202, DAU2 208 and DAU3 211 may transport the optical signals to and from the network of DRUs, at cells 1 205, 2 206, and 3 207.

Benefits of daisy chaining RDUs according to some embodiments may include connecting multiple RDUs in near proximity to each other with minimal cabling. In addition, another RDU may be easily connected in the daisy chain with minimal cabling.

An RDU communicates over the air with a base station (BTS). The base station is generally specific to a given operator. The RDU is required to frequency select via a digital filter the band allocated to that given operator and reject signals from other operators. This approach is required to insure that another operator's signal is not transported to the venue. The RDU will contain a digital bandpass filter for the receive as well as the transmit paths. The installer will select the digital bandpass filters.

Figure 2B:
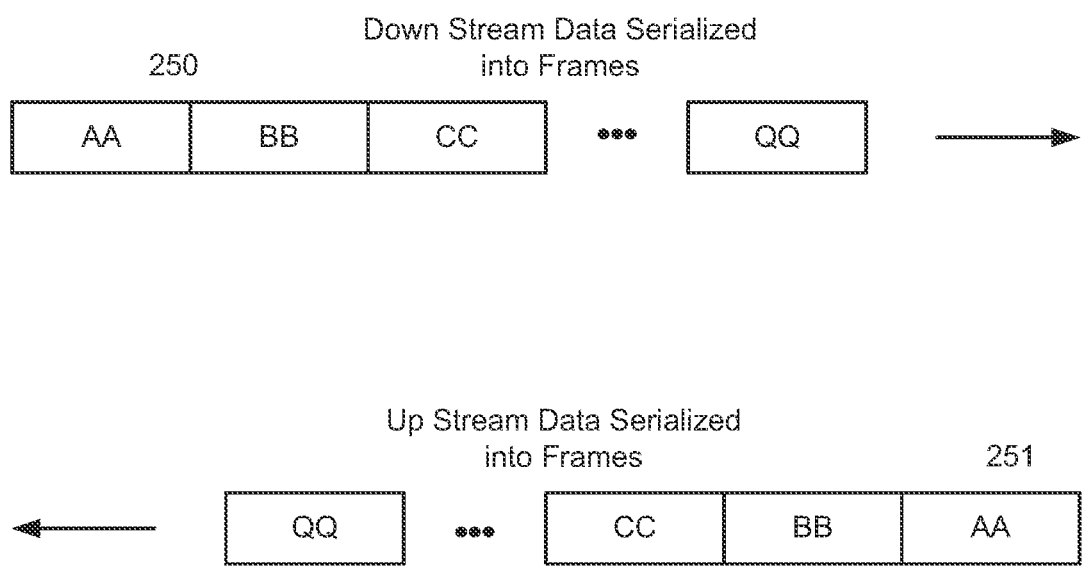
FIG. 2B is a timing diagram reflecting the framing of the multiple frequency bands for the uplink and downlink signals according to some embodiments.

Referring to FIG. 2B, timing schematics 250 and 251 show example timing diagrams for different frequency bands for the uplink signals and downlink signals. Each frequency band is allocated a time slot and the signals are time multiplexed together. The same principles may hold true for the upstream frames shown in timing schematic 251. These principles may be consistent with the multiplexing examples described in any of the disclosures herein. The time divisions may be of any evenly divided lengths, and embodiments are not so limited.

Figure 3:
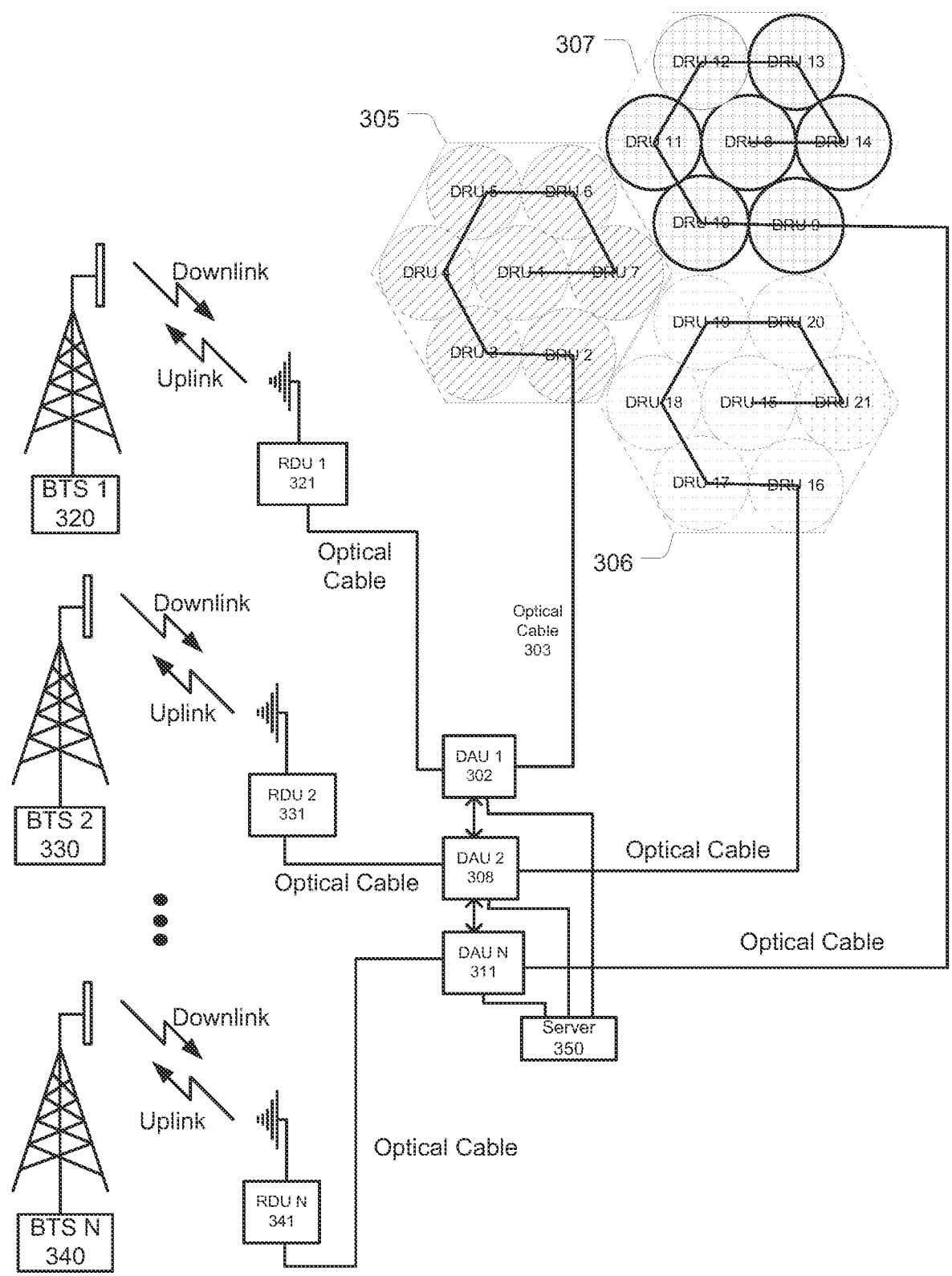
FIG. 3 is a block diagram according to some embodiments showing a basic structure and an example of the transport routing based on having multiple RDUs at local locations with multiple DAUs at a local location, and multiple Digital Remote Units (DRUs) at a remote location and optical interfaces to the Remotes.

Referring to FIG. 3, a DAS system employing multiple Repeater Digital Units (RDUs) at the local location and multiple Digital Remote Units (DRUs) at the remote location may be depicted according to some embodiments. In some embodiments, each RDU may provide unique information associated with each RDU, which uniquely identifies data received and transmitted by a particular Digital Remote Unit. In some embodiments consistent with FIG. 3, the individual RDUs may be independently connected to DAUs. FIG. 3 may show how some embodiments may have separate RDUs connected directly to a separate DAU, in neither a daisy chain or a star configuration. Such embodiments may be useful when operators desire their own separate connection from their BTS to the subscribers within the DRU cells, e.g., cell 1 305, cell 2 306, or cell 3 307.

The servers illustrated herein, for example, server 350, may provide unique functionality in the systems described herein. The following discussion related to server 350 may also be applicable to other servers discussed herein an illustrated in the figures. Server 350 can be used to set up the switching matrices to allow the routing of signals between the remote DRUs. The server 350 can also store configuration information, for example, if the system gets powered down or one DRU or RDU goes off-line and then you power up the system, it will typically need to be reconfigured. The server 350 can store the information used in reconfiguring the system and/or the DRUs, RDUs or DAUs.

Another advantage of embodiments according to FIG. 3 may be that all signals occur off air. In other words, there is no BTSs connected via RF cable. For example, an operator like AT&T may not want to share anything with another operator, like Verizon. Each operator may want their own equipment. With their own equipment, each operator may control the power levels and other configurable parameters.

While each operator may have their own equipment according to FIG. 3, there may still be value in connecting each DAU to each other, also shown in FIG. 3. For example, routing signals from one DAU to another may still be desired. This may be because, for example, the DRU cells as shown in FIG. 3 may be connected via optical cable to only one of the three DAUs. Each DRU cell may provide coverage to different geographic areas, and each operator may still desire to provide coverage to all three areas. Thus, any or every BTS may still want to have access to the different cells, which in this case may require a connection to each DAU. In cases like these, a neutral host built into the DAUs may provide access from the different DAUs to the DRU cells without interfering with each operator's own telecommunications operations. A neutral host may itself be a repeater, not unlike the RDUs described in the present disclosures.

Thus, in some embodiments, the repeater concept familiar to those with ordinary skill in the art may be redistributed into at least two repeater elements, according embodiments consistent with FIG. 3. Persons of ordinary skill in the art may observe that RDU1 321 and DRU16 together may act as a repeater in the traditional sense. This is because RF is coming into the RDUs, and RF is going out of the DRUs, which may be what a traditional repeater may behave like. Of course, the bifurcation of the repeater concept may not be trivial or obvious without the present disclosures.

Figure 4:
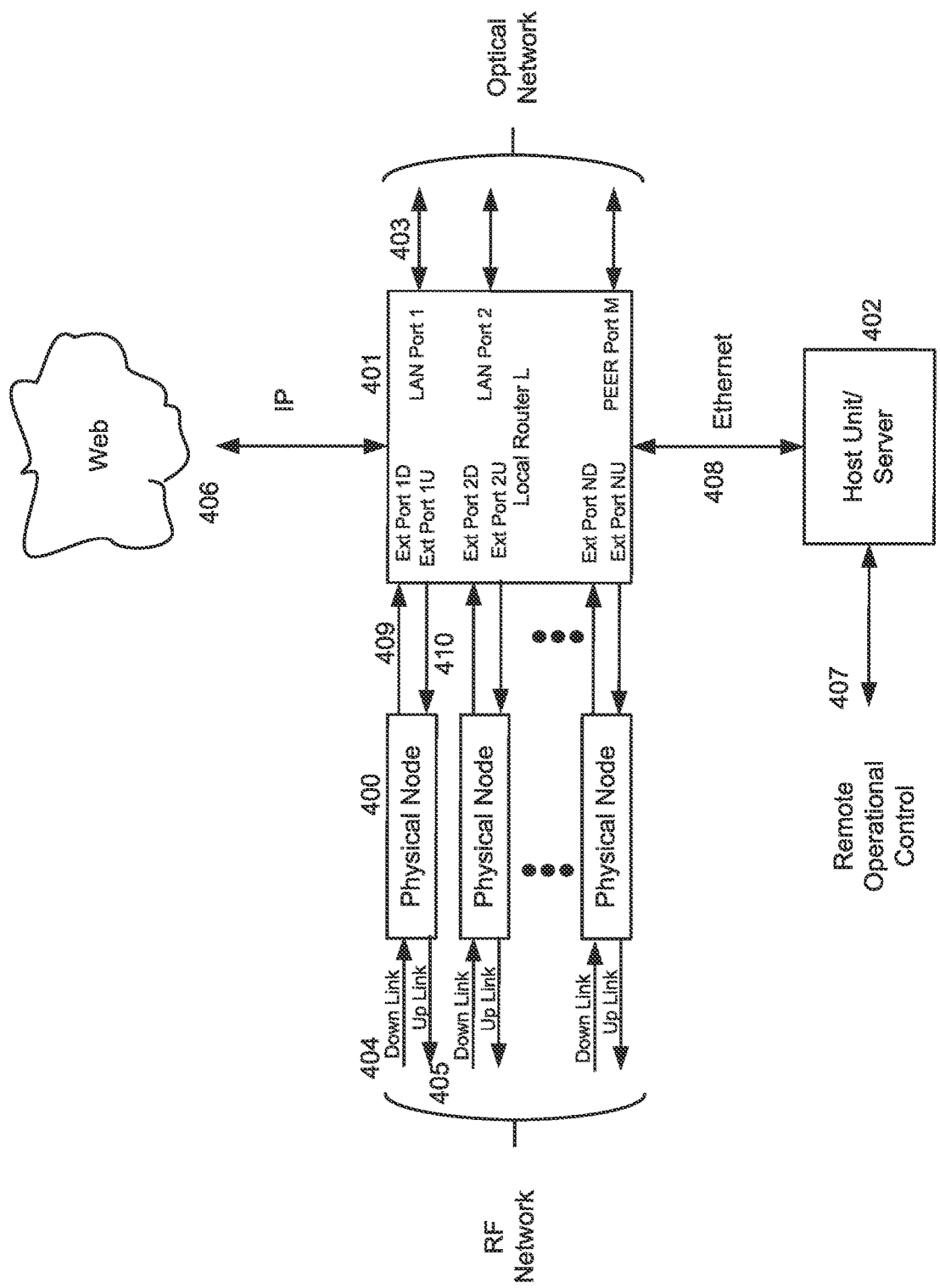
FIG. 4 is a block diagram illustrating a DAU, which contains physical Nodes and a Local Router, according to some embodiments.

FIG. 4 may show two elements in a DAU, the Physical Nodes 400 and the Local Router 401. The Physical Nodes translate the RF signals to baseband for the Downlink and from baseband to RF for the Uplink. The local Router directs the traffic between the various LAN Ports, PEER Ports and the External Ports. The physical nodes connect to the BTS at radio frequencies (RF). The physical nodes can be used for different operators, different frequency bands, different channels, or the like. The physical nodes can combine the downlink and uplink signals via a duplexer or they can keep them separate, as would be the case for a simplex configuration.

FIG. 4 may illustrate a digital access unit (DAU) according to some embodiments whereby the physical nodes have separate outputs for the uplinks 405 and separate inputs for the downlink paths 404. A DAU consistent with FIG. 4 may serve as one of the DAUs found in any of FIG. 1, 2, or 3. The physical node may translate the signals from RF to baseband for the downlink path and from baseband to RF for the uplink path. The physical nodes are connected to a local Router via external ports 409, 410. The router may direct the uplink data stream from the LAN and PEER ports (e.g., LAN Port 1, LAN Port 2, PEER Port M, etc.) to the selected External U ports. Similarly, the router directs the downlink data stream from the External D ports to the selected LAN and PEER ports.

Embodiments may vary or reconfigure which ports 401 may be LAN or PEER. FIG. 4 is merely one example, and many other configurations are possible according to embodiments of the present invention. DAUs of some embodiments may be reconfigurable in this sense in order to adapt to the various DAS configurations possible, examples of which may include FIGS. 1, 2, and 3.

A difference between a LAN port and a PEER port may be that a LAN port would have the downlink signal going out, and the uplink signal coming back. A PEER port would be the exact opposite. It would have the downlink signal coming into the DAU, and the uplink signal going out of it. Thus, when provisioning the DAU, for example, assume that there is a repeater RDU1 connected to PEER port M. If is it known there is a repeater there, then it may be understood that a PEER connection must be established. Thus, the port is designated as a PEER port. In contrast, a LAN port, e.g., LAN port 1, may connect up to the daisy chain of DRUs, as shown in FIGS. 1, 2, and 3.

As another example, PEER ports may provide the connection between DAU1 102 and DAU2 108 of FIG. 1, which may be represented as the two-way arrow between the DAUs 102 and 108 according to the figures. In another example, PEER ports may be used to daisy chain the DAUs together.

Referring again to FIG. 4, in some embodiments, the LAN and PEER ports may be connected via an optical fiber to a network of DAUs and DRUs. The network connection can also use copper interconnections such as CAT 5 or 6 cabling, or other suitable interconnection equipment. The DAU is also connected to the internet network using IP 406. An Ethernet connection 408 is also used to communicate between the Host Unit 402 and the DAU. The DRU and RDU can also connect directly to the Remote Operational Control center 407 via the Ethernet port. Again, these descriptions may be consistent with the DAUs shown in FIGS. 1, 2, and 3.

Figure 5:
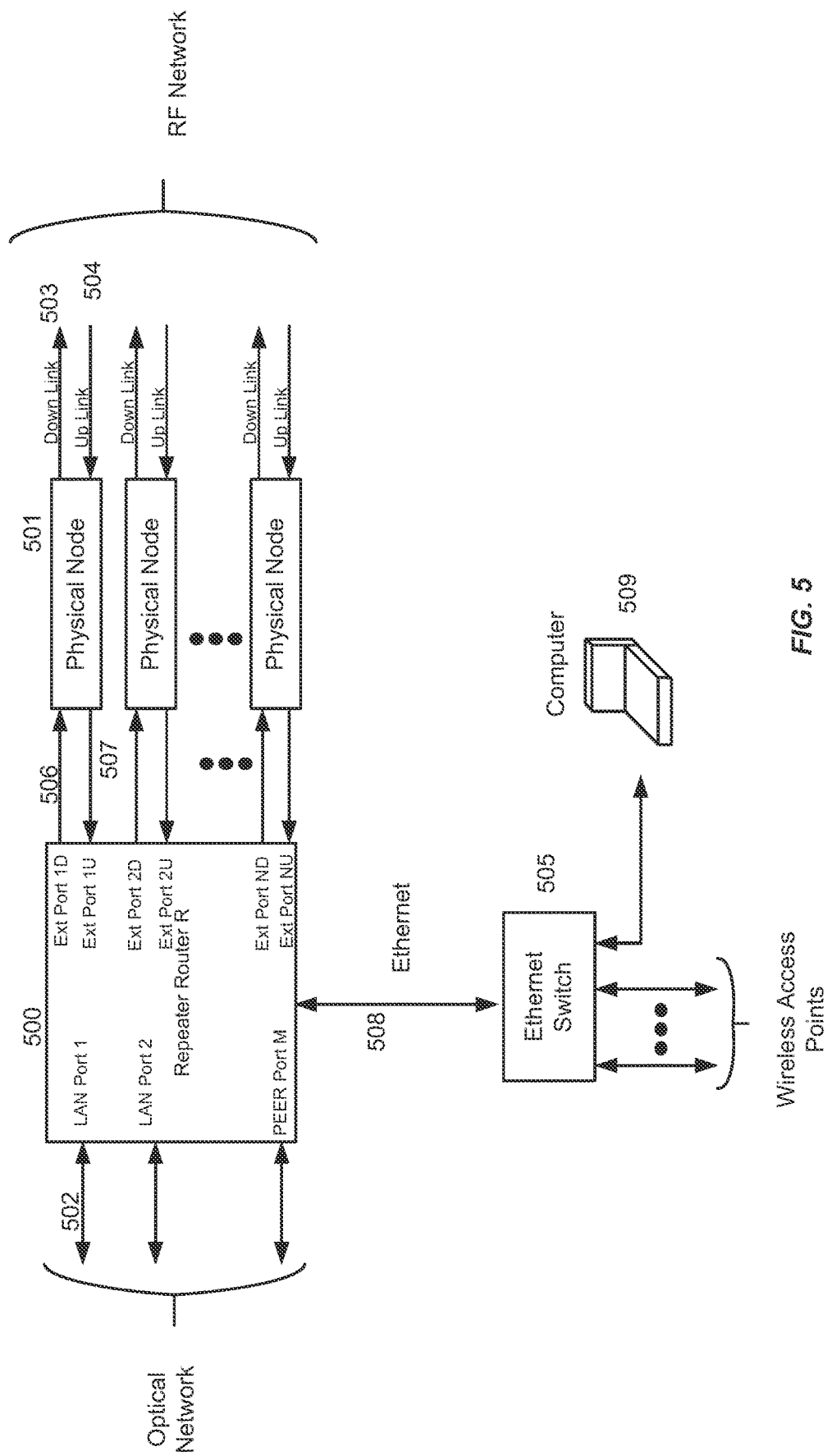
FIG. 5 is a block diagram illustrating a Repeater Digital Unit (RDU), which contains physical Nodes and a repeater router, according to some embodiments.

FIG. 5 may show two elements in a repeater digital unit (RDU) according to some embodiments: the Physical Nodes 501 and the Repeater Router 500. The RDU may include both a Repeater Router and Physical Nodes. The Repeater Router may direct the traffic between the LAN ports, External Ports and PEER Ports. The physical nodes may connect wirelessly to the BTS at radio frequencies (RF). The physical nodes can be used for different operators, different frequency bands, different channels, different antennas, etc. FIG. 5 shows an embodiment whereby the physical nodes have separate inputs for the uplinks 504 and separate outputs for the downlink paths 503. A physical node may translate signals from RF to baseband for the uplink path and from baseband to RF for the downlink path. The physical nodes are connected to a Repeater Router via external ports 506, 507. The router may direct the downlink data stream from the LAN and PEER ports to the selected External D ports. Similarly, the router directs the uplink data stream from the External U ports to the selected LAN and PEER ports. The RDU may also contain an Ethernet Switch 505 so that a remote computer or wireless access points can connect to the internet.

In some embodiments, the RDUs each have an amplifier to send out the uplink signal down to a BTS. For example, in FIG. 1, an amplifier in RDU1 120 may be included to send that signal out to BTS2 130. In DRU16, the amplifier is actually in the downlink path. Thus, structurally a larger amplifier on the different uplink for the repeater may be needed as opposed to the downlink for the DRU16. Thus, one difference to note between a RDU and a DRU may be that the uplink and downlink signals are reversed in a RDU compared to a DRU, and vice versa. That is, the downlink signals come in to a DRU, while the downlink signals go out of the RDU.

In some embodiments, a RDU and a DAU may be constructed quite similarly, such that a single platform may easily switch from being configured as a RDU to a DAU. Such a construction may be another benefit according to some embodiments, allowing for flexibility, cost efficiency, elegant design and ease of replacement, among other advantages.

In some embodiments, the DAU may be connected to a host unit/server, whereas the RDU may not connect to a host unit/server. In these embodiments, parameter changes for the RDU may be received from a DAU, with the central unit that updates and reconfigures the RDU being part of the DAU, which can be connected to the host unit/server. Embodiments of the present invention are not limited to these embodiments, which are described only for explanatory purposes.

Figure 6:
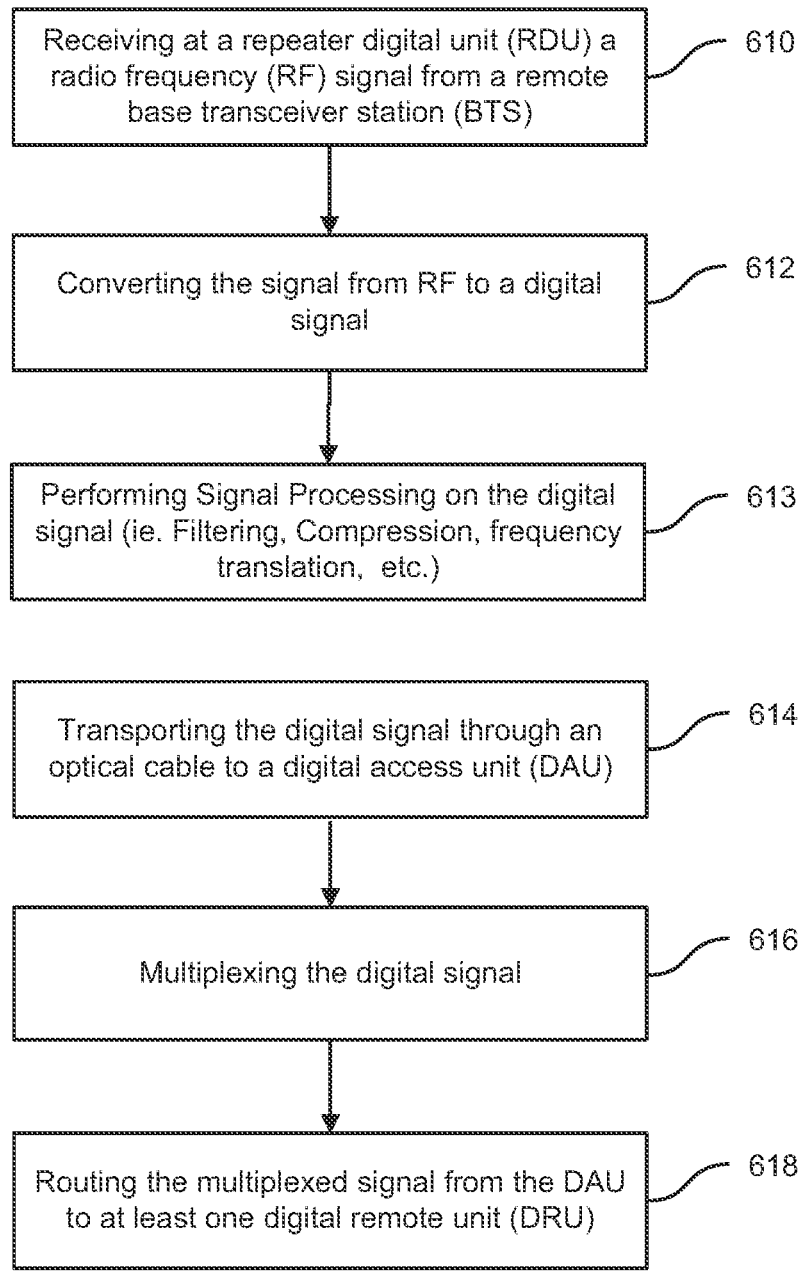
FIG. 6 illustrates an example flowchart according to some embodiments.

Referring to FIG. 6, example flowchart 600 shows example method steps according to some embodiments. At block 610, embodiments may receive at a repeater digital unit (RDU) a radio frequency (RF) signal from a remote base transceiver station (BTS). Example processes of block 610 may be consistent with any of the descriptions in FIGS. 1, 2, and 3 related to receiving signals at any RDU described. Returning to FIG. 6, at block 612, embodiments may convert the signal from RF to a digital signal. The conversion may occur in the RDU, consistent with descriptions in FIG. 5, for example. Returning to FIG. 6, signal processing of the digital signal will occur at block 613. The signal processing may include filtering, data compression, frequency translation, etc. At block 614, embodiments may transport the digital signal through an optical cable to a digital access unit (DAU). Again, FIGS. 1, 2, and 3 may show examples of this transportation. Returning to FIG. 6, block 616, embodiments may multiplex the digital signal.

Examples of multiplexing the digital signal may include combining two or more signals that occur at different frequencies or frequency bands. For example, a first operator, e.g., AT&T may transmit a first signal via a first BTS with a first frequency. A second operator, e.g., Verizon, may transmit a second signal via a second BTS with a second frequency different than the first. The two signals may be multiplexed such that a single combined signal contains information sufficient to filter out the two original signals at a later time and place. These descriptions may be consistent with those discussed in FIGS. 1, 2, and 3. In FIG. 6, at block 618, embodiments may route the multiplexed signal from the DAU to at least one digital remote unit (DRU). The routing may be sent over optical cable or Ethernet cable, for example. These descriptions may be consistent with those found in FIGS. 1, 2, and 3.

Additionally, some embodiments may include that the RF signal from the remote base station has a downlink and an uplink. Some embodiments may include that the RDU and/or the DAU has PEER ports and LAN ports. PEER ports may be distinguished from LAN ports based on which path to and from the RDU and/or DAU is designated as a downlink path versus an uplink path.

Figure 7:
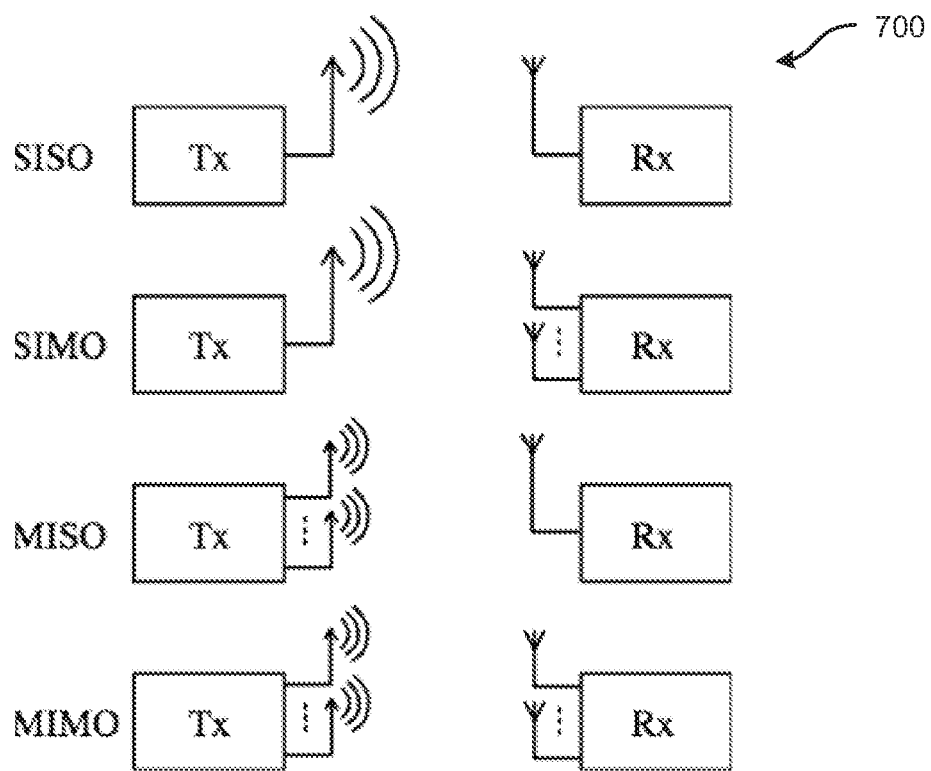
FIG. 7 is an illustration of multiple-input multiple-output (MIMO) configurations, according to some embodiments.

FIG. 7 is an illustration 700 of a multiple input-multiple output (MIMO) configuration. The number of transmit (Tx) antennas and receive (Rx) antennas will determine the classification of the system. MIMO systems can be expanded to N Transmit antennas and M Receive antennas, where N and M are integers greater than one.

Figure 8:
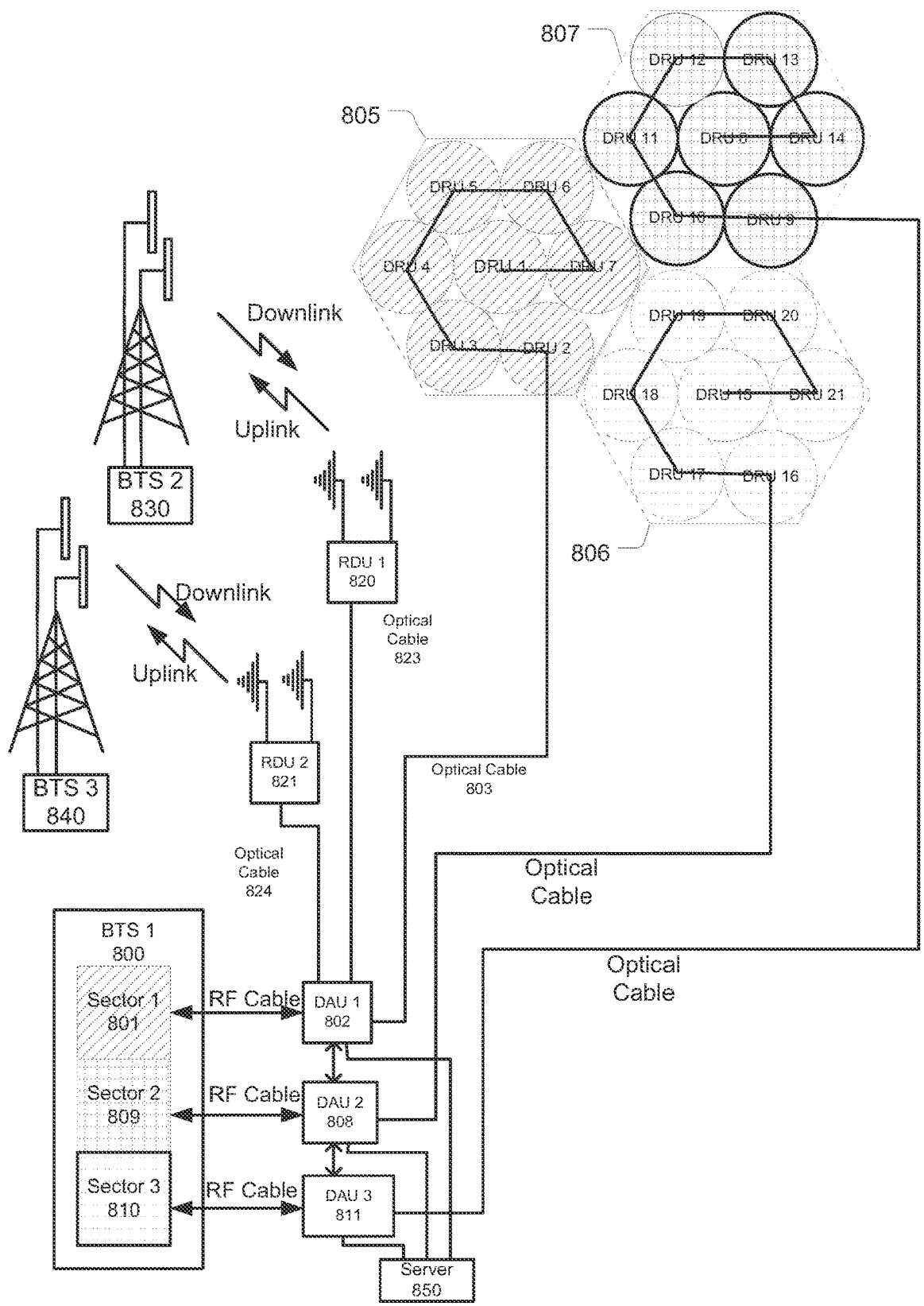
FIG. 8 is a block diagram according to some embodiments showing a basic structure and an example of the transport routing based on having multiple MIMO (multiple input-multiple output) RDUs at local locations with multiple DAUs at a local location, and multiple Digital Remote Units (DRUs) at a remote location and optical interfaces to the Remotes.

FIG. 8 demonstrates the application of a MIMO repeater, RDU1 820, according to some embodiments. Also shown is another MIMO repeater RDU2 821. A MIMO repeater according to some embodiments interfaces with a DAU before the signal is transported out to the remote units. The MIMO RDUs can be cascaded together at the DAU as shown in FIG. 8 or they could be daisy-chained together. Each antenna in a MIMO RDU may be treated as a separate frequency band, and thus MIMO signals transmitted to and received from the DAU, e.g., DAU1 802, may be similarly time division multiplexed, as described in the disclosures above. For example, extra time slots for the signals from the additional antennas may be provided as information travels through the optical cables 823 and 824. In some embodiments, no other configurations need to be modified in comparison to non-MIMO RDUs.

It is also understood that the examples and embodiments described herein are for illustrative purposes only and that various modifications or changes in light thereof will be suggested to persons skilled in the art and are to be included within the spirit and purview of this application and scope of the appended claims.

Glossary of Terms

| | |
|---|---|
| ACPR | Adjacent Channel Power Ratio |
| ADC | Analog to Digital Converter |
| AQDM | Analog Quadrature Demodulator |
| AQM | Analog Quadrature Modulator |
| AQDMC | Analog Quadrature Demodulator Corrector |
| AQMC | Analog Quadrature Modulator Corrector |
| BPF | Bandpass Filter |
| BTS | Base Transceiver Station |
| CDMA | Code Division Multiple Access |
| CFR | Crest Factor Reduction |
| DAC | Digital to Analog Converter |
| DAS | Distributed Antenna System |
| DAU | Digital Access Unit |
| DET | Detector |
| DHMPA | Digital Hybrid Mode Power Amplifier |
| DDC | Digital Down Converter |
| DNC | Down Converter |
| DPA | Doherty Power Amplifier |
| DQDM | Digital Quadrature Demodulator |
| DQM | Digital Quadrature Modulator |
| DRU | Digital Remote Unit |
| DSP | Digital Signal Processing |
| DUC | Digital Up Converter |
| EER | Envelope Elimination and Restoration |
| EF | Envelope Following |
| ET | Envelope Tracking |
| EVM | Error Vector Magnitude |
| FFLPA | Feedforward Linear Power Amplifier |
| FIR | Finite Impulse Response |
| FPGA | Field-Programmable Gate Array |
| GSM | Global System for Mobile communications |
| I-Q | In-phase/Quadrature |
| IF | Intermediate Frequency |
| LINC | Linear Amplification using Nonlinear Components |
| LO | Local Oscillator |
| LPF | Low Pass Filter |
| MCPA | Multi-Carrier Power Amplifier |
| MDS | Multi-Directional Search |
| MIMO | Multiple Input Multiple Output |
| OFDM | Orthogonal Frequency Division Multiplexing |
| PA | Power Amplifier |
| PAPR | Peak-to-Average Power Ratio |
| PD | Digital Baseband Predistortion |
| PLL | Phase Locked Loop |
| QAM | Quadrature Amplitude Modulation |
| QPSK | Quadrature Phase Shift Keying |
| RF | Radio Frequency |
| RDU | Repeater Digital Unit |
| RRH | Remote Radio Head |
| RRU | Remote Radio Head Unit |
| SAW | Surface Acoustic Wave Filter |
| UMTS | Universal Mobile Telecommunications System |
| UPC | Up Converter |
| WCDMA | Wideband Code Division Multiple Access |
| WLAN | Wireless Local Area Network |

The invention claimed is:

1. A distributed antenna system (DAS) comprising:

a repeater including a first port, the first port operable to communicate wirelessly via an antenna with at least one remote signal source comprising a remote base transceiver station (BTS), and a second port, the second port operable to communicate with at least one digital access unit (DAU);

a converter operable to convert communications to and from the remote signal source and the DAU between analog signals and digital signals; and a third port associated with the DAU operable to route digital signals to one or more remote units, wherein the DAU is operable to route communications between at least one of the repeater or a local signal source comprising a local base transceiver station (BTS) and at least one of the one or more remote units, the one or more remote units are located at different locations than the repeater, and the DAU operable to communicate with the at least one of the repeater or the local signal source via at least one of an RF cable, digital cable, or optical cable.

2. The system of claim 1 wherein the third port comprises an optical port.

3. The system of claim 1 wherein the first port comprises a first an RF port, and the third port comprises an RF port.

4. The system of claim 3 wherein the third port is operable to communicate with the local BTS via a cable.

5. The system of claim 1 wherein the remote BTS is located remotely from the DAU.

6. The system of claim 1 wherein the second port is operable to communicate with a sector of the BTS.

7. The system of claim 1 wherein the DAU is coupled to the repeater via an optical fiber.

8. The system of claim 1 wherein the DAU is operable to exchange digital signals with the repeater.

9. The system of claim 1 wherein the DAU is operable to route the digital signals to another DAU.

10. The system of claim 1 wherein the DAU is operable to route the digital signals to another signal source.

11. A system comprising:
a repeater configured to communicate wirelessly with at least one remote signal source comprising at least one remote base transceiver station (BTS), and communicate with at least one digital access unit (DAU) via a wired connection;
a converter configured to convert communications to and from the at least one remote signal source and the at least one DAU between analog and digital; and
each digital access unit configured to route digital signals from the digital access unit to another digital access unit,
wherein the digital access unit is operable to communicate with the at least one remote BTS or at least one local BTS via at least one of an antenna or a cable.

12. The system of claim 11 wherein the at least one remote BTS is located remotely from the digital access unit.

13. The system of claim 11 wherein the digital access unit is operable to communicate with a sector of the local BTS, and the digital access unit is operable to exchange digital signals with the repeater.

14. The system of claim 11 wherein each digital access unit is further configured to route digital signals between the at least one remote signal source or the at least one local signal source and at least one remote unit.

15. A method comprising:
communicating, by a remote digital unit, wirelessly with at least one remote signal source comprising a remote base transceiver station (BTS);
communicating, by the remote digital unit, with at least one digital access unit via a cable connection;
converting communications to and from the at least one remote signal source and the at least one digital access unit between analog and digital; and
routing digital signals from at least one of the remote BTS or a local signal source comprising a local base transceiver station (BTS) via at least one of an antenna or a cable.

16. The method of claim 15 comprising:
routing digital signals between the at least one remote signal source or the at least one digital access unit and at least one remote unit.

17. The method of claim 15 comprising:
exchanging digital signals between the digital access unit and the remote digital unit.

18. The method of claim 15 comprising:
routing digital signals from the digital access unit to another digital access unit.

19. The method of claim 15 wherein the cable connection comprises at least one of an RF cable or an optical fiber.

20. The method of claim 15 wherein the cable comprises at least one of an RF cable or a digital cable.

* * * * *